US010768680B2

(12) United States Patent
Muralidhar et al.

(10) Patent No.: US 10,768,680 B2
(45) Date of Patent: *Sep. 8, 2020

(54) HARDWARE APPARATUSES AND METHODS TO PERFORM TRANSACTIONAL POWER MANAGEMENT

(71) Applicant: Intel Corporation, Santa Clara, CA (US)

(72) Inventors: Rajeev D. Muralidhar, Bangalore (IN); Harinarayanan Seshadri, Bangalore (IN); Nivedha Krishnakumar, Bangalore (IN); Youvedeep Singh, Bangalore (IN); Suketu R. Partiwala, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/678,025

(22) Filed: Aug. 15, 2017

(65) Prior Publication Data

US 2018/0059766 A1 Mar. 1, 2018

Related U.S. Application Data

(63) Continuation of application No. 14/752,896, filed on Jun. 27, 2015, now Pat. No. 9,733,689.

(51) Int. Cl.
*G06F 1/00* (2006.01)
*G06F 1/3206* (2019.01)
(Continued)

(52) U.S. Cl.
CPC .......... *G06F 1/3206* (2013.01); *G06F 1/3203* (2013.01); *G06F 1/3287* (2013.01);
(Continued)

(58) Field of Classification Search
CPC ........ G06F 1/3206; G06F 1/3203; G06F 9/52; G06F 1/3287; G06F 9/30083; Y02D 10/171
See application file for complete search history.

(56) References Cited

U.S. PATENT DOCUMENTS 8,601,288 B2 12/2013 Brinks et al.
2011/0252245 A1* 10/2011 Lai ........................ G06F 1/3203
713/300
(Continued)

FOREIGN PATENT DOCUMENTS

CN 102681937 A 9/2012
JP 2002-023884 1/2002
(Continued)

OTHER PUBLICATIONS

Extended European Search Report for Application No. 16171196.5, dated Nov. 11, 2016, 8 pages.
(Continued)

*Primary Examiner* — Xuxing Chen
(74) *Attorney, Agent, or Firm* — Nicholson De Vos Webster & Elliott LLP

(57) ABSTRACT

Methods and apparatuses relating to transactional power management are described. In one embodiment, a hardware apparatus includes a hardware processor having a core, a plurality of power domains to transition to one of a plurality of power states in response to a power management command for each power domain, and a power transaction unit to assign a first power management command as a first power transaction and a second power management command as a second power transaction for concurrent execution, perform a commit of the first power transaction and the second power transaction when there is no conflict between the first power transaction and the second power transaction, and perform an abort of the first power transaction and a
(Continued)

commit of the second power transaction when there is a conflict between the first power transaction and the second power transaction.

24 Claims, 14 Drawing Sheets

(51) Int. Cl.
 *G06F 9/30* (2018.01)
 *G06F 1/3287* (2019.01)
 *G06F 9/52* (2006.01)
 *G06F 1/3203* (2019.01)

(52) U.S. Cl.
 CPC ............ *G06F 9/30083* (2013.01); *G06F 9/52* (2013.01); *Y02D 10/171* (2018.01)

(56) References Cited

U.S. PATENT DOCUMENTS

| | | |
|---|---|---|
| 2012/0054511 A1 | 3/2012 | Brinks et al. |
| 2013/0073878 A1 | 3/2013 | Jayasimha et al. |
| 2014/0115270 A1 | 4/2014 | Wu et al. |
| 2016/0110403 A1 | 4/2016 | Lomet et al. |

FOREIGN PATENT DOCUMENTS

| | | |
|---|---|---|
| JP | 2006-107494 | 4/2006 |
| JP | 2012-137946 A | 7/2012 |
| JP | 2013-137689 A | 7/2013 |
| JP | 2014-089752 A | 5/2014 |
| KR | 20110050724 A | 5/2011 |
| KR | 20130082152 A | 7/2013 |
| WO | 2014035541 A1 | 3/2014 |

OTHER PUBLICATIONS

Non-Final Office Action from U.S. Appl. No. 14/752,896, dated Nov. 22, 2016, 8 pages.
Notice of Allowance from U.S. Appl. No. 14/752,896, dated Apr. 13, 2017, 9 pages.
Office Action from foreign counterpart Korean Patent Application No. 10-2016-0065505, dated Aug. 22, 2017, 6 pages.
First Office Action and Search Report from foreign counterpart Chinese Patent Application No. 201610362190.0, dated Feb. 2, 2019, 16 pages.
Notification to Grant, CN App. No. 201610362190.0, Feb. 3, 2020, 4 pages (2 pages of English Translation and 2 pages of Original Document).
Second Office Action, CN App. No. 201610362190.0, Jul. 10, 2019, 8 pages (5 pages of English Translation and 3 pages of Original Office Action).
Notice of Reason for Rejection, JP Ap. No. 2016-094197, dated Jul. 18, 2017, 7 pages (4 pages of English Translation and 3 pages of Original Document).

\* cited by examiner

```
pmu_pci_set_power_state()
down(&mid_pmu_cxt->scu_ready_sem)
pmu_issue_interactive_command
    _pmu2_wait_not_busy()
        do {
            if (_pmu_read_status(PMU_BUSY_STATUS) == 0)
                return 0;
            udelay(1);
        } while (--pmu_busy_retry);
        WARN(1, "pmu2 busy!");
        return -EBUSY;
    writel(command, &mid_pmu_cxt->pmu_reg->pm_cmd);
    return 0;
up(&mid_pmu_cxt->scu_ready_sem);
return status;
```

FIG. 4

```
T1
atomic {
    pci_set_power_state(dev A, state B);
}
T2
atomic {
    pci_set_power_state(dev C, state D);
}
```

FIG. 5

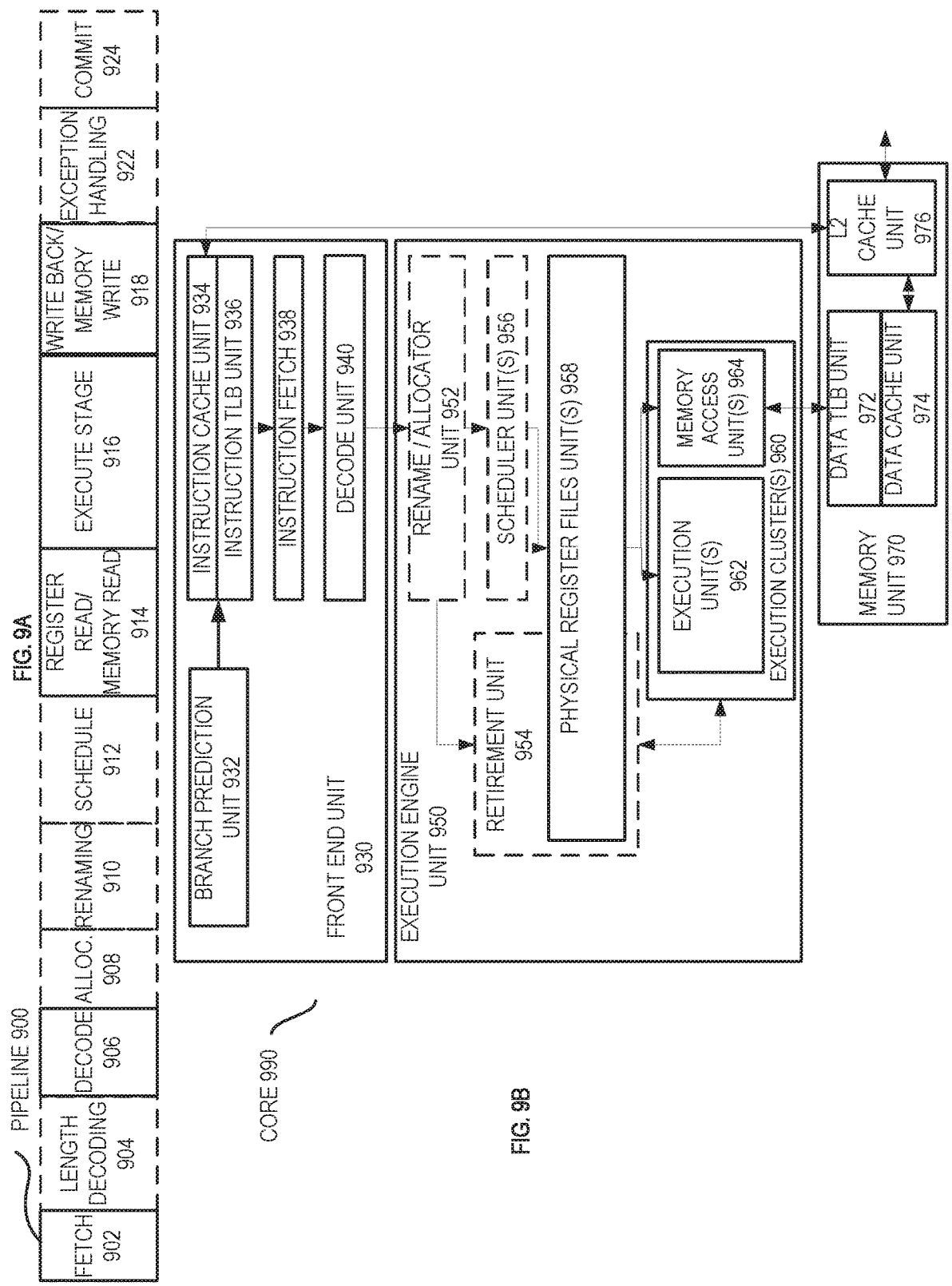

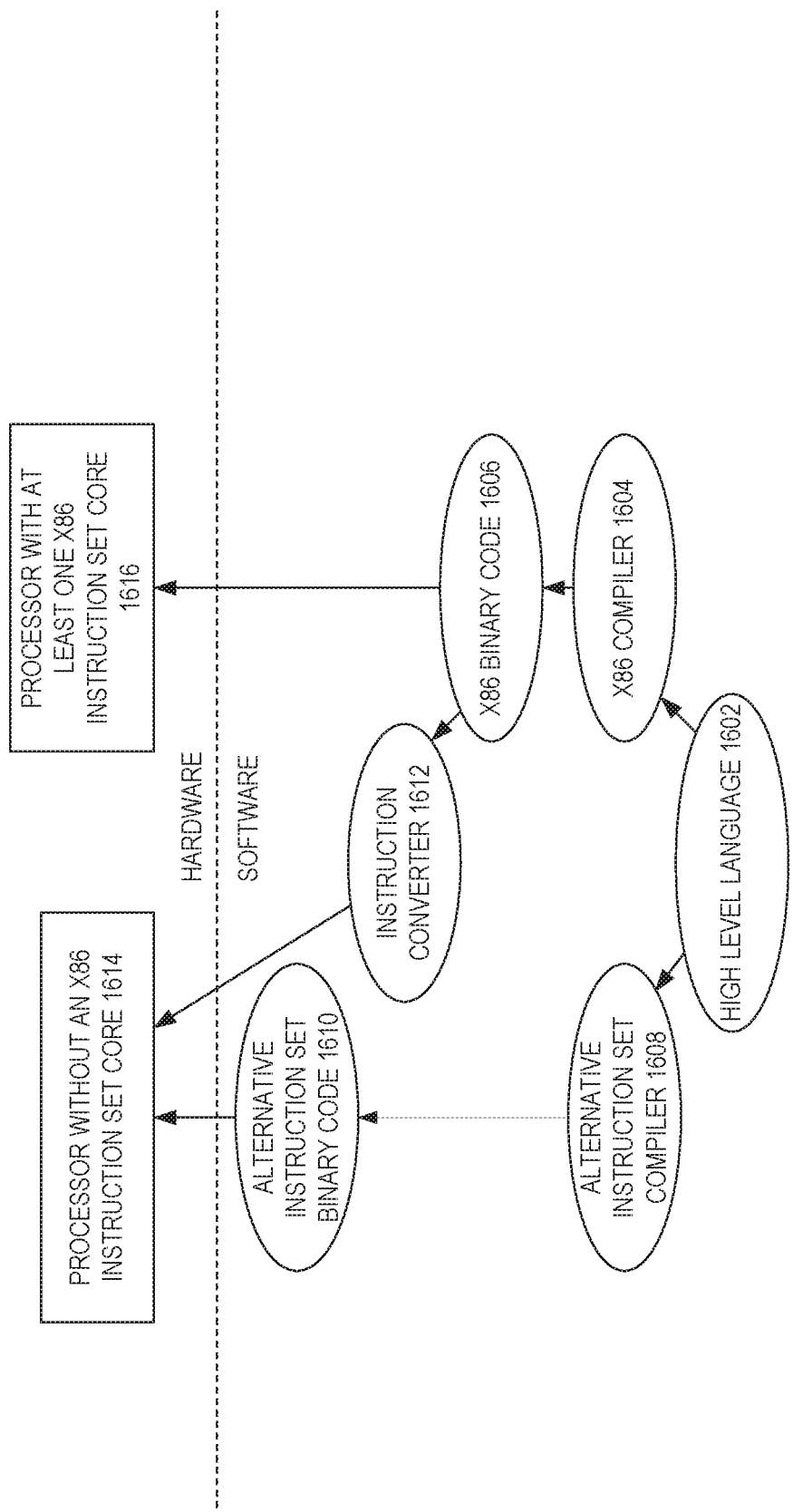

HARDWARE APPARATUSES AND METHODS TO PERFORM TRANSACTIONAL POWER MANAGEMENT

CROSS-REFERENCE TO RELATED APPLICATIONS

The present patent application is a continuation application claiming priority from U.S. patent application Ser. No. 14/752,896, filed Jun. 27, 2015, and titled: "Hardware Apparatuses and Methods to Perform Transactional Power Management", which is incorporated herein by reference in its entirety.

TECHNICAL FIELD

The disclosure relates generally to electronics, and, more specifically, an embodiment of the disclosure relates to a hardware processor with a power transaction unit to perform transactional power management.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O).

BRIEF DESCRIPTION OF THE DRAWINGS

The present disclosure is illustrated by way of example and not limitation in the figures of the accompanying drawings, in which like references indicate similar elements and in which:

FIG. 4 illustrates power management code for a system without power transactions according to embodiments of the disclosure.

FIG. 5 illustrates power management code for a system with power transactions according to embodiments of the disclosure.

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

FIG. 16 is a block diagram contrasting the use of a software instruction converter to convert binary instructions in a source instruction set to binary instructions in a target instruction set according to embodiments of the disclosure.

DETAILED DESCRIPTION

Figure 1:
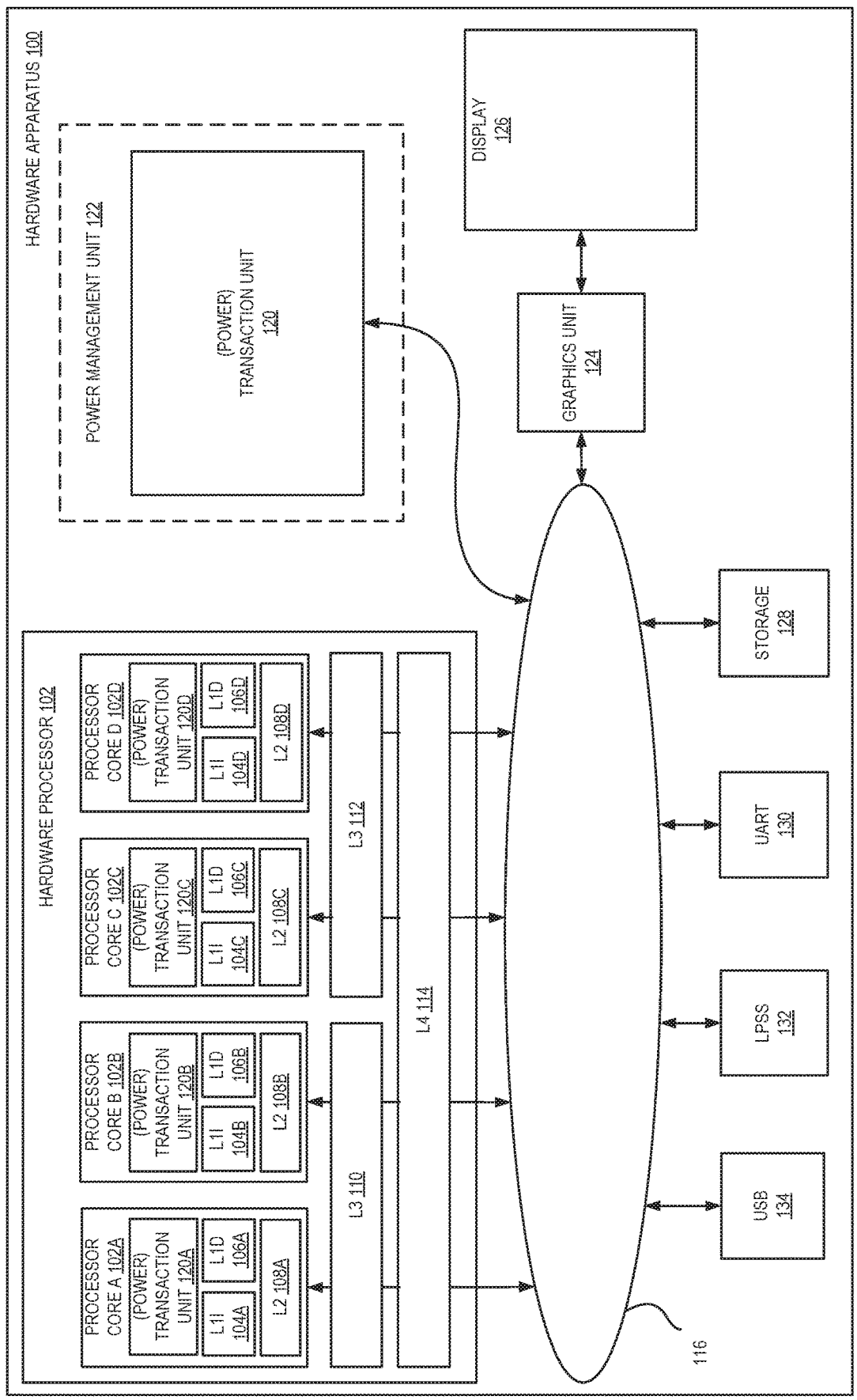
FIG. 1 illustrates a hardware apparatus according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decode unit (decoder) decoding macro-instructions. A processor (e.g., having one or more cores to decode and/or execute instructions) may operate on data, for example, in performing arithmetic, logic, or other functions.

A hardware processor (e.g., as part of a computing system) may transition power of one or more of its components (e.g., cores and/or devices) between power states, for example, according to the Advanced Configuration and Power Interface (ACPI) specification. In one embodiment, a component may be powered at one of multiple operating states, an idle state, or an off state. For example, a first power state may be a maximum power and frequency and a second power state may be a lower power and frequency (e.g., but not idle). A power state transition may take multiple clock cycles (e.g., from multiple instructions being executed to cause the power state transition) to perform a transition from a first state to a second state, e.g., on request. Power may be provided by a battery or other power source. A power management unit may conserve power by placing the processor and/or its devices (e.g., display, input/output (I/O) ports, etc.) in various power states, for example, an idle or off state when there are no operations to be performed (e.g., no instructions to be executed by a core of a processor). In certain embodiments, a power management unit may manage power consumption by making a power state determination and/or transition. Additionally or alternatively, power management may be implemented by an operating system (OS), e.g., via a driver communicating between the OS and the device that is to have its power state transitioned (e.g., modified).

In certain embodiments of this disclosure, power management may utilize a processor (e.g., low power micro controller(s)) coexisting with software (e.g., the OS and/or applications). In certain embodiments of this disclosure (e.g., for energy efficiency), an OS may decentralize the power control within its domain, for example, leaving each device domain to control its own state. However, from a power management flow perspective, this may lead to contention and race conditions as the power management (e.g., transition) commands are issued and/or executed, e.g., by a power management unit. This may be addressed by taking a lock(s) (e.g., using semaphores or other means), for example, to stall or cancel one power transition request while another power transition (e.g., process) occurs. This may cause energy inefficiency, for example, if a lock is maintained for an entire power transition (e.g., either device level control, or set of devices, or for the platform). Certain embodiments of this disclosure may provide scalable power management, e.g., without utilizing a lock. Certain embodiments of this disclosure may provide power management without utilizing coarse-grained locks or synchronization, for example, in the OS or with a power management unit (e.g., a processor's power management controller (PMC) or storage controller unit (SCU)), or a combination of both. Certain embodiments of this disclosure may provide power management without putting a (e.g., high level, coarse-grained) lock in by the OS where only one power transition (e.g., request) may be sent to the hardware at a time.

Certain embodiments of this disclosure include power management apparatuses (e.g., processor(s) and/or system(s)-on-a-chip (SOC)) and methods to perform transactional power management. For example, each power state transition (e.g., of a device, component, and/or a power domain) may be represented as a transaction. In one embodiment, a power state transition (e.g., from one state to a different state) may be requested by receipt of a power management command, for example, sent to a control input of a power management unit (e.g., an input for each power domain). Certain embodiments of this disclosure include power management apparatuses and methods to parallelize power management commands. Certain embodiments of this disclosure include transactional memory (e.g., management) apparatuses and methods to perform transactional power management. Power management according to this disclosure may include power management hardware, software, firmware, or any combinations thereof.

In one embodiment, a transaction is guaranteed according to one, all, or any combination of atomicity, consistency, isolation, and durability (ACID) properties. Atomicity (e.g., being atomic) may generally refer to a transaction being "all or nothing". For example, if one part of the transaction fails, then the entire transaction fails and the data that was operated on is left unchanged. An atomic system may guarantee atomicity in each and every situation, e.g., including power failures, errors, and crashes. Outside of the transaction, a committed transaction appears (e.g., by its effects on the operated on data) to be indivisible ("atomic") and an aborted transaction (e.g., not committed) appears to not have happened. Consistency may generally refer to any transaction is to bring the data from one valid state to another. For example, any written data is to be valid according to all defined rules, e.g., including constraints, cascades, triggers, and any combinations thereof. This may not guarantee correctness of the transaction in all ways, e.g., that may be the responsibility of application-level code, but may guarantee that any programming errors will not result in the violation of any defined rules. Isolation may generally refer to concurrent execution of transactions (e.g., threads) resulting in a same system state that would have been obtained if those transactions were executed serially, e.g., one after the other. Concurrency control may provide isolation. For example, depending on the concurrency control method, the effects of an incomplete transaction may not be visible to other transaction(s). Durability may generally refer to once a transaction has been committed, it is to remain so, e.g., even in the event of power loss, crashes, or errors. For example, to defend against power loss, transactions (or their effects) may be recorded in a non-volatile (e.g., persistent) memory.

Certain embodiments of this disclosure include power management apparatuses and methods to represent power state transition(s) as transaction(s). This may allow a semantically accurate (e.g., multi-processor) view of the power states of devices (e.g., a processor, a system on a chip (SoC), and/or a platform). Additionally, representing a power state transition as a power transaction may allow a more ordered, semantically accurate way to model, specify, and verify a power management transition. In certain embodiments, implementing power management transitions as transactional memory sequences may allow a semantically accurate multiple-processor view of the power states of devices, SOCs, and/or platforms. Additionally, representing power state transitions as transactions may bring a more ordered, semantically accurate way to model, specify, and verify power (e.g., management) transitions. In certain embodiments, representing power transitions as transactions may be a powerful way to specify power sequences in hardware, firmware, and software, for example, the semantically coherent representations aiding in power management verification of devices, SOCs, and/or platforms.

In one embodiment, power management apparatuses and methods may declare a region of code (e.g., a thread or threads) as a (e.g., single) transaction. A transaction may execute and atomically commit all the results to memory (e.g., when the transaction succeeds) or abort and cancel all the results (e.g., if the transaction fails). A transaction may be performed according to the atomicity, consistency, isolation and durability (ACID) properties, e.g., discussed above. Transactions may safely execute in parallel, for example, to replace techniques such as locks and semaphores. Certain embodiments may also include a performance benefit, for example, as locks may be pessimistic and assume that the locking thread will write to data, so the progress of other threads may be blocked. In one embodiment herein without locks, two transactions which both access a shared resource (e.g., a same memory address or register) may proceed in parallel, and a rollback (e.g., an abort of one or both of the transactions) may only occurs if one of the transactions writes (e.g., a conflicting write) to the shared resource.

Power management apparatuses and methods may receive a plurality of requests (e.g., from hardware, an OS, or a driver) for power state transitions (e.g., indicating which device or domain and/or new power level to transition into). In one embodiment, a power state transition may be requested by a power management command (e.g., a thread of instructions to execute on a processor to accomplish the transition). In one embodiment, a power management command may be sent from a requestor (e.g., an OS) to a device (e.g., a control input) to be transitioned. A power state transition may be declared as a transaction, for example, a power management command (e.g., thread) that is assigned as a power transaction. As such, the power state transition (e.g., the operations to cause a power state transition) may be treated as a (e.g., single) power transaction such that the power management apparatuses and methods do not issue locks when manipulating (e.g., changing power states) the data structures (e.g., held in memory, registers, data inputs, etc.) that control and/or are part of the power state transition. In one embodiment, a power state transaction includes starting the state transition operation(s) before attempting any modifications to the data structures, making their changes to a copy (e.g., a reference version) of the data structures (e.g., in a cache), and when the operations are finished, commit the transaction if no conflicts occurred. During the transaction, the power transaction unit (e.g., system) may keep track (e.g., log) of all the data structures that those operations performed a read and/or a write. Before the power transaction is committed, the power transaction unit may check that no other transaction (e.g., its operations) made any changes to the data structures the transaction used. If there were no changes, the transaction may be committed. If there were changes, the transaction may be aborted, e.g., such that all of its changes are undone. In one embodiment, the aborted transaction (e.g., its operation(s)) may be retried, for example, under a different strategy (e.g., using lock(s)) or cancelled. Thus power state transition attempts for multiple devices may occur in parallel as power state transactions. In one embodiment, a device and/or domain includes a power management register to cause a power state transition on receipt of a write of a power management command into the register, for example, a power management command may be a bit or bits that indicate a new power state for the device. In one embodiment, software (e.g., an OS) requests a power state transition, for example, after detecting that a device (and/or power domain) is not being utilized, it may indicate to idle or turn off that device. A device may include a component(s) (e.g., a peripheral) that is external to a processor, e.g., not on-die with the processor. Multiple devices may include shared resources, for example, those devices being controlled by the same clock or being in the same power domain (e.g., powered by the same power rail of a power supply). OS may indicate or detect which power domain(s) will be used so as to execute a power management command (e.g., thread). For example, a power transaction hint (e.g., atomic" in reference to FIG. 5 below) may be included in the code to indicate to the OS or hardware that a power management command (e.g., to request a power state transition) is to be treated as a transaction.

As one example, a first device (e.g., a USB hub) and a second device (e.g., a network adapter) may each be in an active power state and power management commands may be sent (e.g., from their respective drivers) to transition each to an idle or off power state. The first power management command (e.g., for the USB hub) and the second power management command (e.g., for the network adapter) may be sent, e.g., by an OS, and received by a power transaction unit of a processor or SoC. The power transaction unit may detect that the requested power state transitions for each power management command are to be power transactions, e.g., according to the atomicity, consistency, isolation and/or durability (ACID) properties. The power transaction unit (e.g., in hardware, software, firmware, or combinations thereof) may allow the concurrent (e.g., parallel) execution of the power state transitions, for example, but not yet commit them. This may occur even when those devices are powered by a shared resource. For example, any reads and/or writes (e.g., to the control input(s) and/or output(s)) occurring by the first power command (e.g., thread) and the second power command (e.g., thread) may be tracked. In one embodiment, if there were no (e.g., conflicting) changes of the first power transaction and the second power transaction, they may then be committed (e.g., the devices powered to the idle or off power state). If there were conflicting changes, e.g., one device to be idle and the other device to be in the off state where both devices share a common power resource (e.g., domain) that affects both, then one or both of the transactions may be aborted, for example, according to a conflict resolution policy. One example of a conflict resolution policy is that the first transaction to write to a resource is committed and the second transaction is aborted. Another example of a conflict resolution policy is that the transaction with the highest power state is to be committed and the lesser power state transaction is aborted. Other conflict resolution policies may be included, for example, but not limited to, retrying (e.g., delaying) an aborted transaction, e.g., after the other transaction is committed. In one embodiment, each power transaction (e.g., for a respective thread) may proceed until a conflict between the concurrently executing threads is detected. Certain embodiments herein allow for no lock against concurrently performing (e.g., without committing) a plurality of power transitions.

Note that the figures herein do not depict the power supply (e.g., battery or non-battery) or power supply connections. One of ordinary skill in the art will appreciate that this is to not obscure certain details in the figures. Note that a double headed arrow herein may not require two-way communication, for example, it may indicate one-way communication (e.g., to or from that component or device). Any or all combinations of communications paths may be utilized in embodiments herein.

FIG. 1 illustrates a hardware apparatus 100 according to embodiments of the disclosure. In one embodiment, hardware apparatus 100 may be a SoC. Depicted hardware apparatus 100 includes a hardware processor 102. Although certain components of a hardware processor are depicted, for example, a multiple level cache and multiple cores, other processor(s) may be utilized without departing from the spirit of this disclosure, e.g., those discussed herein. Depicted core A (102A) includes a first level instruction cache (L1I) 104A, a first level data cache 106A, and a level 2 cache (L2) 108A. Depicted core B (102B) includes a first level instruction cache (L1I) 104B, a first level data cache (L1D) 106B, and a level 2 cache (L2) 108B. Depicted core C (102C) includes a first level instruction cache (L1I) 104C, a first level data cache (L1D) 106C, and a level 2 cache (L2) 108C. Depicted core D (102D) includes a first level instruction cache (L1I) 104D, a first level data cache (L1D) 106D, and a level 2 cache (L2) 108D. Depicted hardware cores A and B include a shared level 3 cache (L3) 110. Depicted hardware cores C and D include a shared level 3 cache (L3) 112. Depicted processor 102 includes a shared level 4 cache (L4) 114. Although four cores are depicted, a single core or any plurality of processor cores may be utilized. Although a four level cache is depicted, a single level or any plurality of level cache may be utilized.

In one embodiment, each core has its own power domain. In one embodiment, multiple cores (e.g., core A and core B) has a shared power domain. In one embodiment, an entire cache may have its own power domain. For example, a power transition for L3 cache 110 may cause a power transition for certain or all of the other caches.

A cache coherence unit, for example, as part of a cache, may be utilized according to a cache coherence protocol, e.g., the four state modified (M), exclusive (E), shared (S), and invalid (I) (MESI) protocol or the five state modified (M), exclusive (E), shared (S), invalid (I), and forward (F) (MESIF) protocol.

Any or all combinations of communications paths may be utilized in embodiments herein. For example, processor 102, e.g., a core thereof, may communicate with other devices, for example, over a network (depicted as a ring network 116).

A (e.g., power) transaction unit(s) may be included according to certain embodiments of this disclosure. Each core may include a (e.g., power) transaction unit, for example, (power) transaction units 120A, 120B, 120C, and 120D in their respective cores. Additionally or alternatively, a processor or SoC may include a separate (e.g., power) transaction unit. Depicted hardware apparatus includes power transaction unit 120, e.g., for storing logic to perform the disclosure herein. Although certain other components are depicted, these are examples, and other components may be utilized and/or certain of the depicted components may not be present in a hardware apparatus. Depicted components include a graphics unit 124 (e.g., which may be a graphics processor) which may send display signals to display 126, a storage 128 (e.g., a data storage device which may be on-die or off-die), a universal asynchronous receiver and transmitter (UART) 130, lower power subsystem (LPSS) 132, and a universal serial bus (USB) 134. Graphics unit 124 may be a part of hardware processor 102.

A power management unit 122 may be included, e.g., to manage the flow of power to the devices. A power transaction unit may be included in a power management unit. In one embodiment, each device (e.g., component thereof) may include its own power domain. In one embodiment, multiple devices or components of a device(s) share a single power domain.

As one example, a first device (e.g., USB 134) and a second device (e.g., UART 130) may each be in an active power state and power management commands may be sent (e.g., from their respective drivers) to transition each to an off (or idle) power state. The first power management command (e.g., for the USB 134) and the second power management command (e.g., for the UART 130) may be sent, e.g., by an OS, and received by a power transaction unit (e.g., transaction unit 120). The power transaction unit may detect (e.g., from an indication from the OS) that the requested power state transitions for each power management command are to be power transactions, e.g., according to the atomicity, consistency, isolation and/or durability (ACID) properties. The power transaction unit (e.g., in hardware, software, firmware, or combinations thereof) may allow the concurrent (e.g., parallel) execution of the power state transitions, for example, but not yet commit them. This may occur even when those devices are powered by a shared resource (e.g., being members of the same power domain). For example, any reads and/or writes (e.g., to the control input(s) and/or output(s)) occurring by the first power command (e.g., thread) and the second power command (e.g., thread) may be tracked. A copy of the data to be modified may be made (e.g., a reference version) and may be stored in a cache (e.g., cache of a processor or a separate cache of transaction unit 120). In one embodiment, if there were no conflicts (e.g., conflicting changes) of the first power transaction and the second power transaction, they may then be committed (e.g., the USB 134 and UART 130 devices powered to the off (or idle) power state). If there were conflicts (e.g., conflicting changes), e.g., one device to be idle and the other device to be in the off state where both devices share a common power resource (e.g., domain) that affects both, then one or both of the transactions may be aborted, for example, according to a conflict resolution policy.

In another embodiment, a single device may have its power transition declared as a power transaction. For example, a device (e.g., USB 134) in the process of a power state transition (e.g., to off or idle from an active state) may receive an interrupt (e.g., that a peripheral has been plugged into the USB 134). The power transaction unit may detect this and then abort (e.g., not commit) the in-flight power state transition, e.g., and instead return to the active state.

Figure 2:
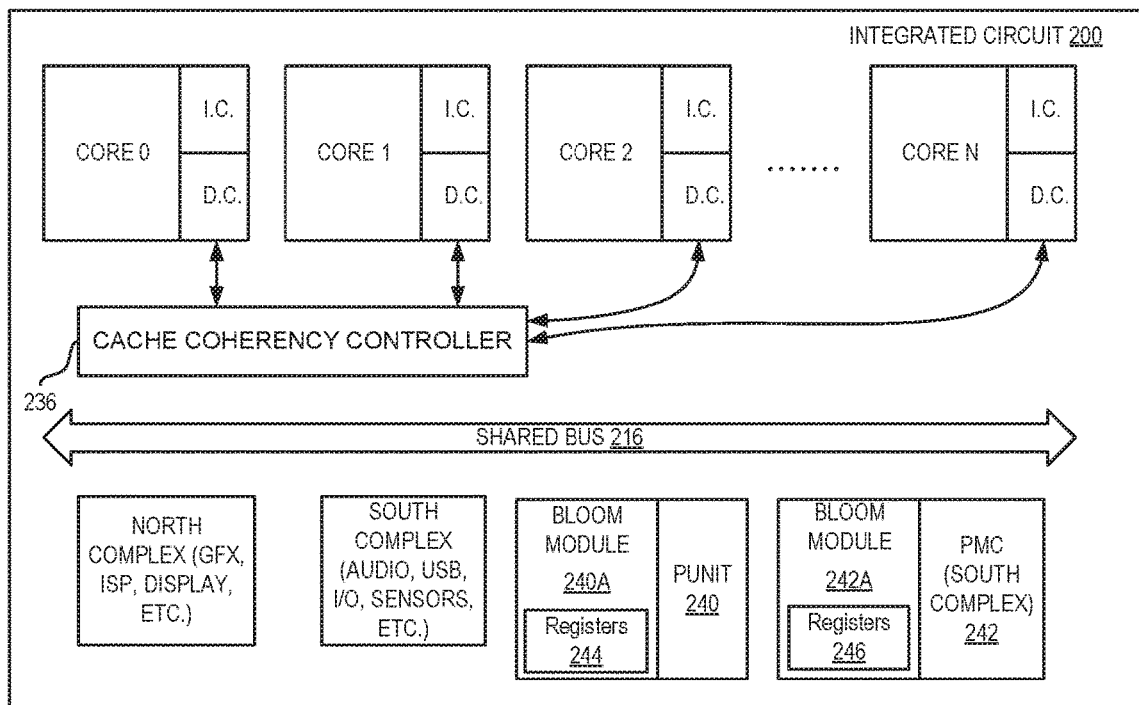
FIG. 2 illustrates an integrated circuit according to embodiments of the disclosure.
Figure 3:
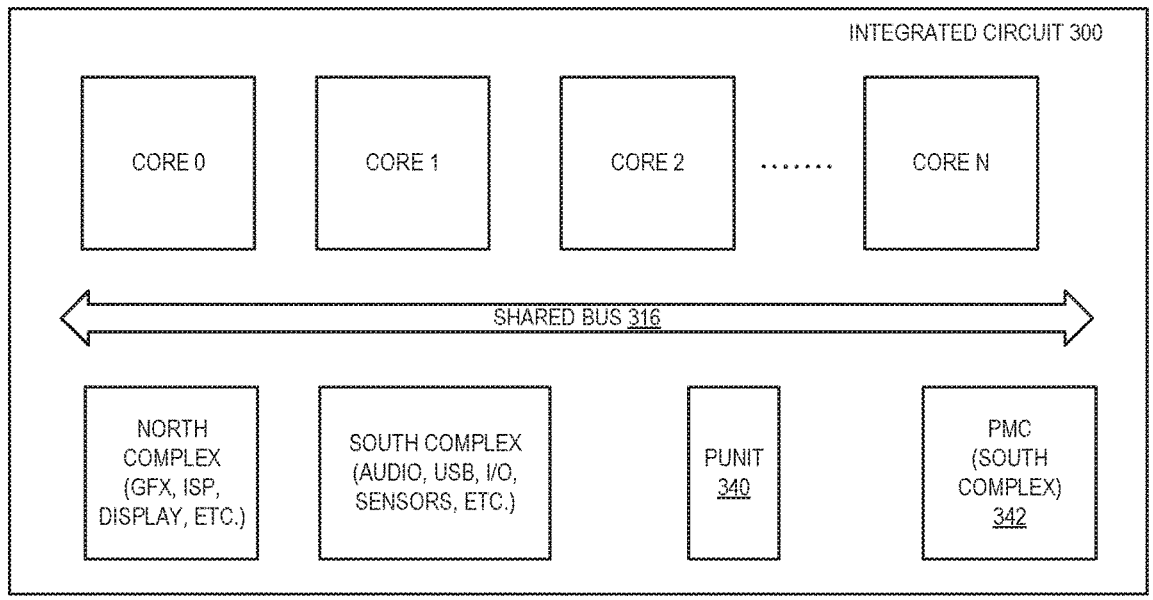
FIG. 3 illustrates an integrated circuit according to embodiments of the disclosure.

Turning to FIGS. 2 and 3, FIG. 2 is used to describe an embodiment where an integrated circuit (e.g., processor cores thereof) does not include support for hardware memory transactions (e.g., transactional memory) and FIG. 3 is used to describe an embodiment where an integrated circuit (e.g., processor cores thereof) does include support for hardware memory transactions (e.g., transactional memory).

FIG. 2 illustrates an integrated circuit 200 according to embodiments of the disclosure. Processor cores 0-N are each depicted as including an (e.g., private) instruction cache (IC) and a (e.g., private) data cache (DC). Further, integrated circuit may include a cache coherency controller 236 to maintain (e.g., global) cache coherency in the (e.g., data) caches. Although certain devices and components are depicted in FIG. 2, these are optional. For example, although a "north complex" power domain and "south complex" power domain are depicted, any power domains may be utilized. Bus 216 may be used for communications.

Cache coherency controller 236 and other modifications discussed may allow transactional power management. Integrated circuit 200 (e.g., SoC) includes power management unit (PUNIT) 240 and power management controller (PMC) 242, for example, each or both of which may be discrete processor cores. PMC 242 may control the power to a domain (e.g., the south complex), for example, in response to a power management command from PUNIT 240.

Hardware power transaction may be implemented as follows, for example, in a system that does not support hardware memory transactions (e.g., transactional memory). A transaction field (e.g., bit) may be included for each cache entry (e.g., a cache line) in the cache system. A data structure (e.g., for each of PUNIT and PMC) may be included to keep track of the transaction history and/or any conflict. Data structure may be accessed to test (e.g., determine) whether an element (e.g., a device) is a member of a set (e.g., a shared power domain or other shared resource). In the depicted embodiment, the data structure is a Bloom filter 240A for PUNIT 240 and a Bloom filter 242A for PMC 242. A Bloom filter may be a (e.g., space-efficient) probabilistic data structure that is used to test whether an element (e.g., a device) is a member of a set (e.g., a shared power domain or other shared resource). In one embodiment, a false positive match may be possible, but a false negative is not, for example, a query thereof for an element returning either "element possibly in set" or "element definitely not in set". PUNIT and PMC may utilize the data structure (e.g., Bloom filters) to provide support for conflict resolution and ordering commits. Data structure (e.g., Bloom filter) may be accessed as (e.g., memory mapped) registers (e.g., registers 244 and 246). Power management registers (not depicted) of PUNIT and PMC may be accessed to cause a power transition. The data structure (e.g., registers 244 and 246) may be exposed into software, e.g., via a transaction application programming interface (API), for example, to be used by software to define transaction boundaries, configure how to handle conflicts (and any retries), etc. Certain embodiments herein thus may provide a scalable hardware and software implementation of transactional power management (e.g., for a sequence of power instructions to be treated as transactions). Representing power state transitions as transactions may bring a more ordered, semantically accurate way to model, specify, and verify power management transitions FIG. 3 illustrates an integrated circuit 300 (e.g., SoC) according to embodiments of the disclosure. In this example, (e.g., all) the processor cores (e.g., including power management controllers) include support for hardware memory transactions (e.g., transactional memory) and thus may allow transactional power management. Components of the integrated circuit may have a (e.g., globally) synchronized view of (e.g., memory and power)) transactions across all components (e.g., all processor cores, including the power management unit (PUNIT) 340 and power management controller (PMC) 342). For example, a system (e.g., SoC) may include a memory transaction unit (e.g., engine) and/or a power transaction unit (e.g., engine). A data structure (e.g., Bloom filter) may not be utilized. A compiler may include support for a transaction to allow power state transitions. Support for memory transactions in a compiler may be utilized to allow transactional power management. Device drivers may annotate their code for power management transactions. This framework may help the OS and other components to be more portable and scalable across multiple core SoCs, e.g., without having to provide point solutions of locking, synchronization, etc. Bus 316 may be used for communications. For FIGS. 2 and 3, the components and devices listed for each of the north complex and the south complex are merely examples.

In one embodiment, a system (for example, with multiple cores) may support hardware transactional memory for a sequence of code marked as transactional by having hardware that guarantees the ACID semantics for that sequence of code, e.g., across all processor cores (and memory). This may be generally referred to as a globally synchronized view of transactions across all cores, for example, so that when one core is executing a code flow (e.g., thread) that is marked transactional, if that code is accessing some data (e.g., in memory), then there is built-in hardware support to ensure that the transactional semantics are maintained for that piece of code (and memory), e.g., across all cores. In one example of such a system, (e.g., all) host drivers may run on the processor (e.g., IA) cores (for example, typically accessing and using main memory for the operations) and any set of host drivers attempting to do transactional power management (e.g., for power management commands (code) marked as transactional) is guaranteed to maintain transactional semantics, for example, when those commands are executed by a core(s) and/or power management unit(s) (e.g., controller with memory access).

Certain embodiments of a system that supports memory transactions may be used to support power transactions, for example, where power management commands are reads and/or writes to memory (e.g., a register). For example, a power management instruction of an ISA may have a field thereof to indicate it is a transaction.

Certain embodiments of this disclosure include hardware and/or software (e.g., runtime) support for one or more of the following: processor cores, as well as (e.g., micro) controllers like PUNIT, PMC, and radio port controller unit (RPCU), e.g., in a mobile device, that implement specific power management commands (e.g., sequences) as transactions (e.g., sequences). Software power transactions may provide abstractions for encapsulating power management commands as transactions, for example, this may be accomplished by power pragmas in compilers to allow software to annotate power management sequences in software (e.g., OS and/or driver) code. Compiler translations may convert software provided power hints (e.g., "atomic" in FIG. 5) to transactional memory instruction sequences that are specific to underlying architectural support for hardware transactional memory. The above may be extended to have a (e.g., micro) controller support hardware transactional memory as well, for example, a separate core or processor used for power management. Hardware (power) transaction support in processors may provide a uniform view of power states of devices and the platform and/or SoC. This framework may allow an OS and other components to be more portable and scalable across multiple core devices (e.g., SoCs), for example, without having to provide point solutions of locking, synchronization, etc. For example, in the example shown in FIG. 5, threads T1 and T2 may execute access to the shared power state registers in shared power resource 601 by encapsulating the threads around an atomic block. When a transaction executes to completion and is committed, its effects may be visible to other transactions. Otherwise the transaction may be aborted and none of its effects may be visible to other transactions.

Certain embodiments herein include indicating (e.g., marking) sections of code which are to access shared objects as transactions, e.g., that are to execute atomically.

FIG. 4 illustrates power management code 400 for a system without power transactions according to embodiments of the disclosure. FIG. 4 illustrates that without power transactions, a system may delay a second power transition until a first power transition has completed. In one embodiment for power state transitions without power transactions, a kernel or device driver may issue a power management command (e.g., a power state transition request) to a single device or multiple devices, for example, based on platform support for this. However, multiple locks and/or synchronization primitives may be used to orchestrate this complex state machine across OS, device drivers, firmware, and hardware, leading to errors (e.g., bugs), race conditions, lockups/starvation, non-portable code, and platform-specific solutions. Further, the time to perform a power state transition without power transactions may take 10 times or more the amount of time when using power transactions, for example, owing to a high latency of suspend and resume without power transactions.

FIG. 5 illustrates power management code 500 for a system with power transactions according to embodiments of the disclosure. Depicted code includes declaring (e.g., by "atomic") that power management commands (e.g., both threads T1 and T2) are to be treated as transactions, for example, according to one or more of the atomicity, consistency, isolation, and durability (ACID) transactional properties. In one embodiment, the computing system (e.g., a compiler) will treat those threads as transactions that may be executed concurrently, e.g., both committing unless there is a conflict.

Figure 6:
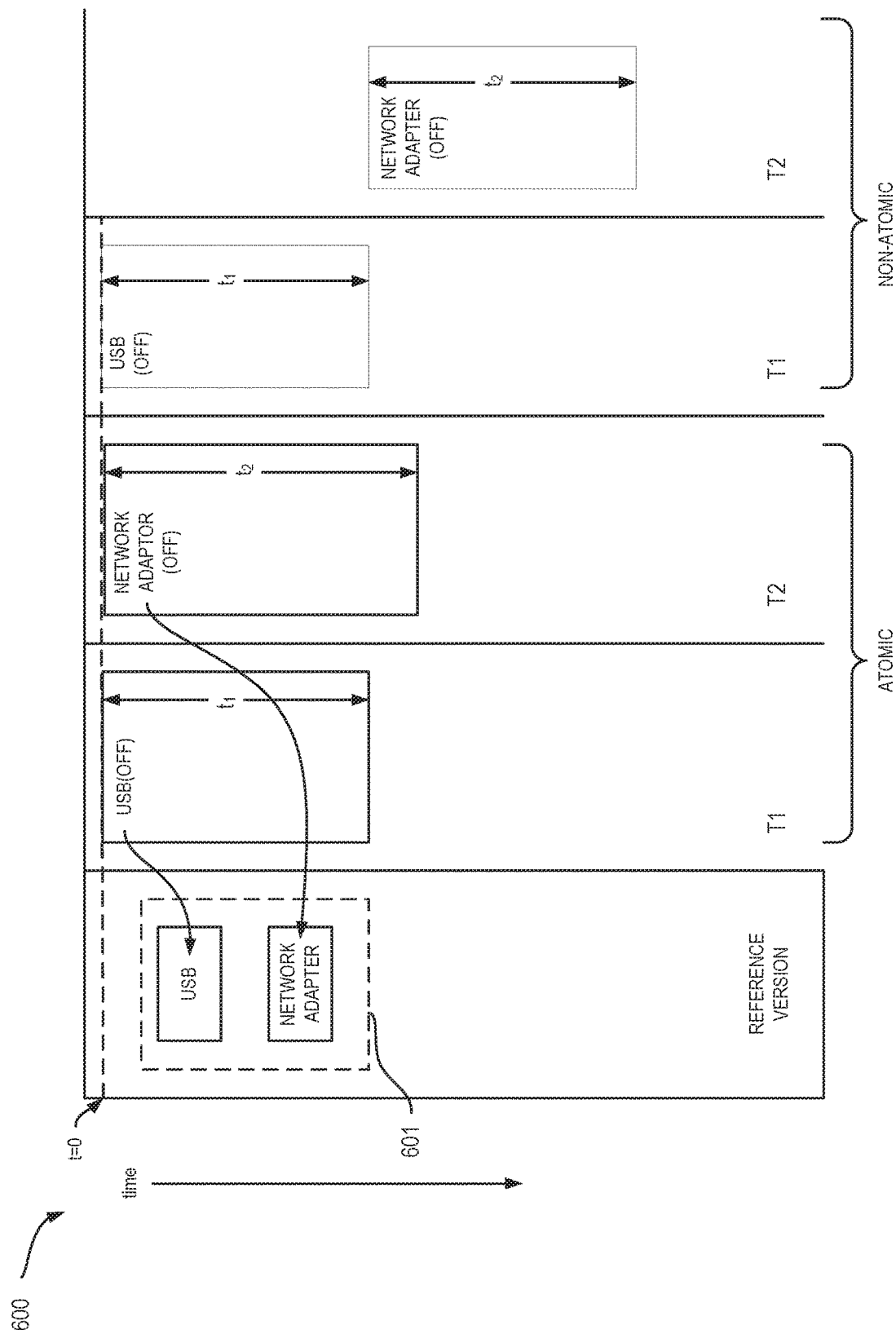
FIG. 6 illustrates a timing schematic with atomic power transactions and without atomic power transactions according to embodiments of the disclosure.

FIG. 6 illustrates a timing schematic 600 with atomic power transactions for T1 and T2 and without atomic power transactions for T1 and T2 according to embodiments of the disclosure. FIG. 6 illustrates that for the atomic power transactions, both threads may concurrently execute, e.g., taking time $t_1$ and $t_2$ to respectively execute (and be committed if there is no conflict caused by their access to power control register(s) for shared power resource 601), in contrast to power management commands (e.g., non-atomic T1 and T2) that complete in series (e.g., at least $t_1+t_2$) as they are not transactions. In one embodiment, each power management command (e.g., thread) is executed on a separate core. In one embodiment, a core may be utilized as a power management unit.

Figure 7:
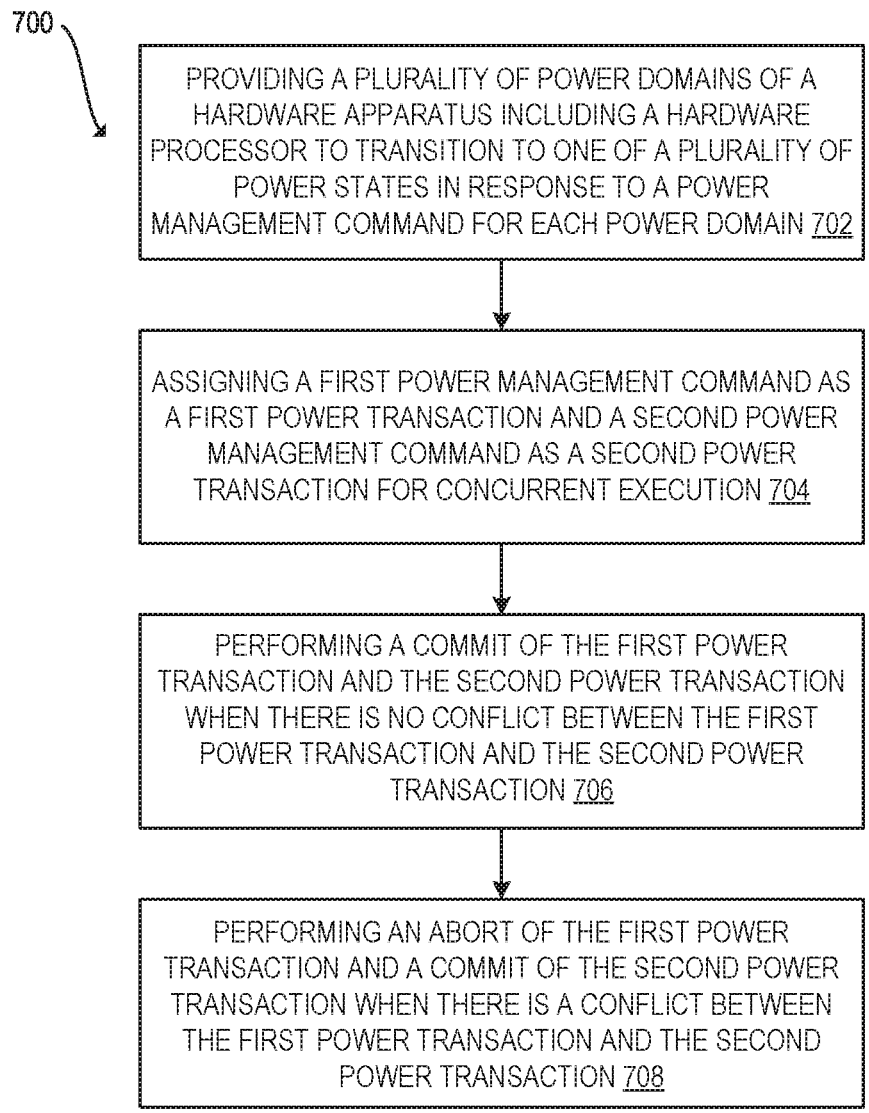
FIG. 7 illustrates a flow diagram according to embodiments of the disclosure.

FIG. 7 illustrates a flow diagram 700 according to embodiments of the disclosure. Depicted flow diagram 700 includes providing a plurality of power domains of a hardware apparatus including a hardware processor to transition to one of a plurality of power states in response to a power management command for each power domain 702, assigning a first power management command as a first power transaction and a second power management command as a second power transaction for concurrent execution 704, performing a commit of the first power transaction and the second power transaction when there is no conflict between the first power transaction and the second power transaction 706, and performing an abort of the first power transaction and a commit of the second power transaction when there is a conflict between the first power transaction and the second power transaction 708.

Figure 8:
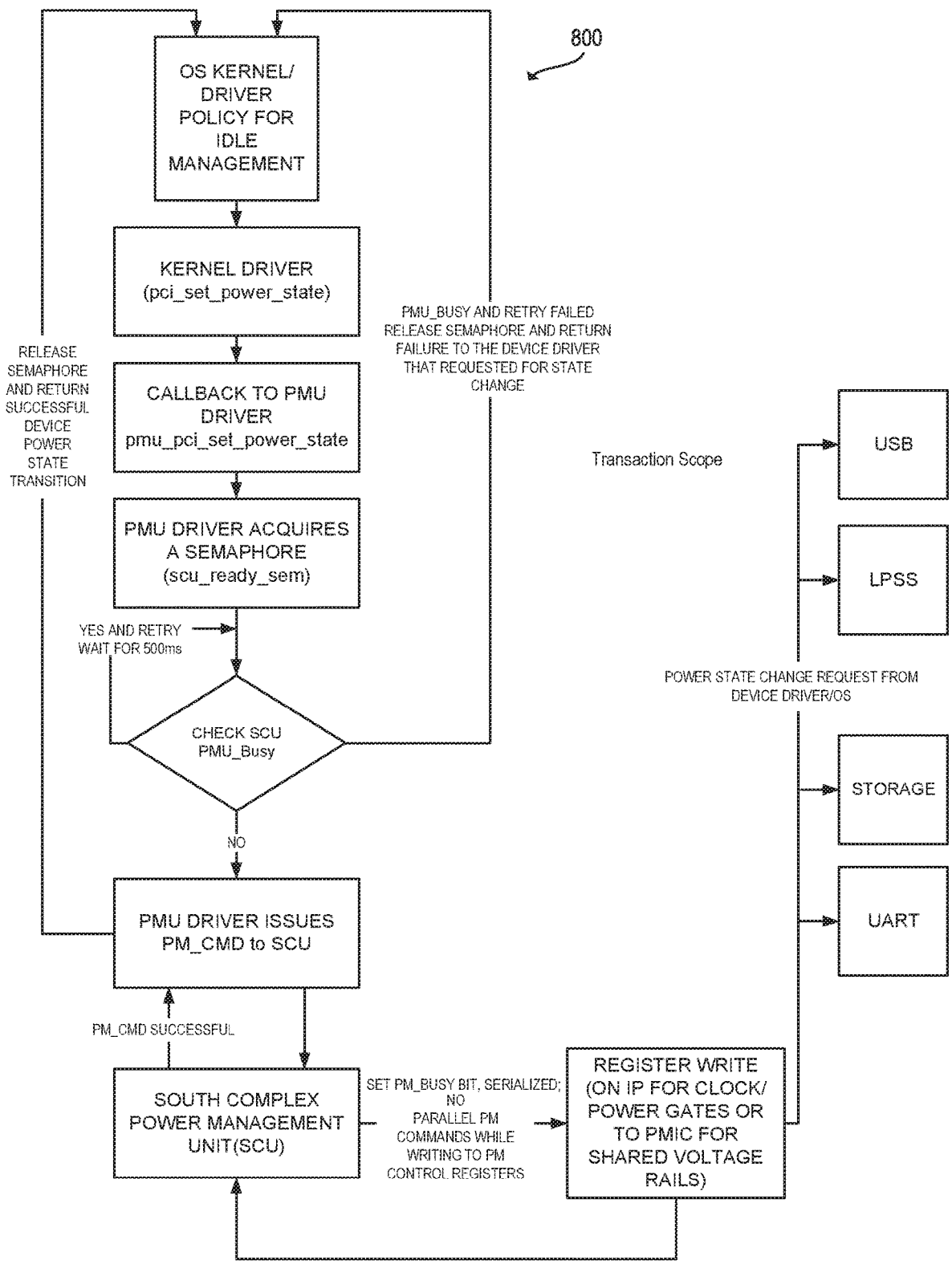
FIG. 8 illustrates a flow diagram according to embodiments of the disclosure.

FIG. 8 illustrates a flow diagram 800 according to embodiments of the disclosure. Depicted flow includes an example power transaction, e.g., all the way from the software (e.g., an OS) to firmware to hardware. In one embodiment, the flow diagram of FIG. 800 may refer to the circuitry in FIGS. 1, 2, and/or 3. PMIC may refer to a power management integrated circuit.

In one embodiment, a hardware apparatus include a hardware processor having a core, a plurality of power domains to transition to one of a plurality of power states in response to a power management command for each power domain, and a power transaction unit to: assign a first power management command as a first power transaction and a second power management command as a second power transaction for concurrent execution, perform a commit of the first power transaction and the second power transaction when there is no conflict between the first power transaction and the second power transaction, and perform an abort of the first power transaction and a commit of the second power transaction when there is a conflict between the first power transaction and the second power transaction. The first power transaction and the second power transaction may each include multiple instructions. The hardware apparatus may further include a plurality of power state registers to receive the power management command for each domain. The conflict may be the first power transaction to write to a power state register that the second power transaction has written. The power transaction unit may not issue a lock. The conflict may be the first power transaction and the second power transaction to write conflicting power management commands for a shared power domain. When there is the conflict, a transition of a power domain in response to execution of the second power transaction may only be visible to other transactions after the commit of the second power transaction. The hardware apparatus may further include a memory transaction unit to perform a commit of a first thread and a second thread after concurrent execution of the first thread on the core and the second thread on a second core of the hardware processor unless the first thread and the second thread are to modify a same memory address.

In another embodiment, a method includes providing a plurality of power domains of a hardware apparatus including a hardware processor to transition to one of a plurality of power states in response to a power management command for each power domain, assigning a first power management command as a first power transaction and a second power management command as a second power transaction for concurrent execution, performing a commit of the first power transaction and the second power transaction when there is no conflict between the first power transaction and the second power transaction, and performing an abort of the first power transaction and a commit of the second power transaction when there is a conflict between the first power transaction and the second power transaction. The first power transaction and the second power transaction may each include multiple instructions. The method may further include receiving the power management command for each domain at a power state register. The conflict may be the first power transaction writing to a power state register that the second power transaction has written. The method may further include not issuing a lock. The conflict may be the first power transaction and the second power transaction writing conflicting power management commands for a shared power domain. When there is the conflict, a transition of a power domain in response to execution of the second power transaction may only be visible to other transactions after the commit of the second power transaction is performed. The method may further include performing a commit of a first thread and a second thread after concurrent execution of the first thread and the second thread on the hardware processor unless the first thread and the second thread are to modify a same memory address.

In yet another embodiment, a non-transitory machine readable storage medium having stored program code that when processed by a machine causes a method to be performed, the method including providing a plurality of power domains of a hardware apparatus including a hardware processor to transition to one of a plurality of power states in response to a power management command for each power domain, assigning a first power management command as a first power transaction and a second power management command as a second power transaction for concurrent execution, performing a commit of the first power transaction and the second power transaction when there is no conflict between the first power transaction and the second power transaction, and performing an abort of the first power transaction and a commit of the second power transaction when there is a conflict between the first power transaction and the second power transaction. The first power transaction and the second power transaction may each include multiple instructions. The method may further include receiving the power management command for each domain at a power state register. The conflict may be the first power transaction writing to a power state register that the second power transaction has written. The method may further include not issuing a lock. The conflict may be the first power transaction and the second power transaction writing conflicting power management commands for a shared power domain. When there is the conflict, a transition of a power domain in response to execution of the second power transaction may only be visible to other transactions after the commit of the second power transaction is performed. The method may further include performing a commit of a first thread and a second thread after concurrent execution of the first thread and the second thread on the hardware processor unless the first thread and the second thread are to modify a same memory address.

In another embodiment, a hardware apparatus includes a hardware processor having a core, a plurality of power domains to transition to one of a plurality of power states in response to a power management command for each power domain, and means to: assign a first power management command as a first power transaction and a second power management command as a second power transaction for concurrent execution, perform a commit of the first power transaction and the second power transaction when there is no conflict between the first power transaction and the second power transaction, and perform an abort of the first power transaction and a commit of the second power transaction when there is a conflict between the first power transaction and the second power transaction.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, April 2015; and see Intel® Architecture Instruction Set Extensions Programming Reference, October 2014).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 10B:
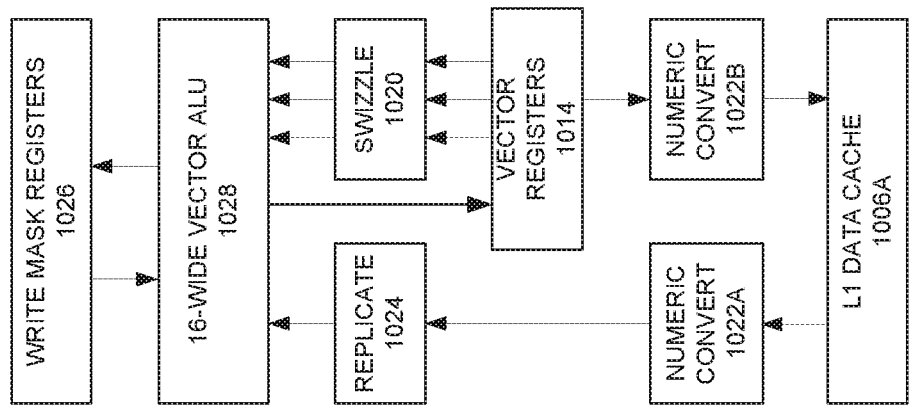
FIG. 10B is an expanded view of part of the processor core in FIG. 10A according to embodiments of the disclosure.
Figure 10A:
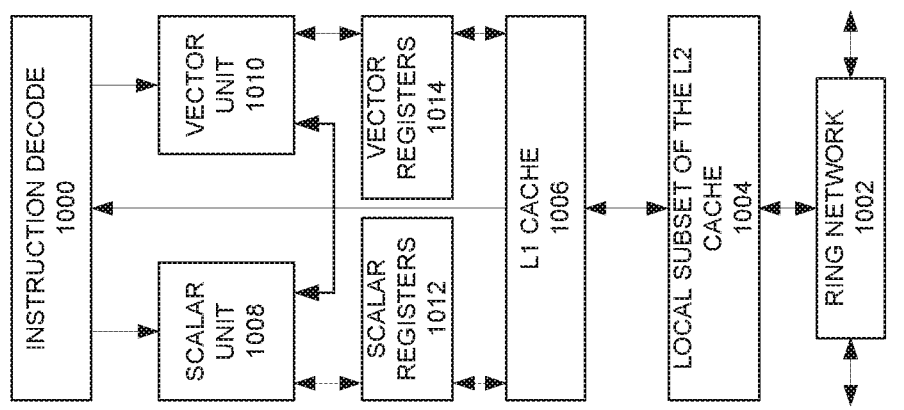
FIG. 10A is a block diagram of a single processor core, along with its connection to the on-die interconnect network and with its local subset of the Level 2 (L2) cache, according to embodiments of the disclosure.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache

1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
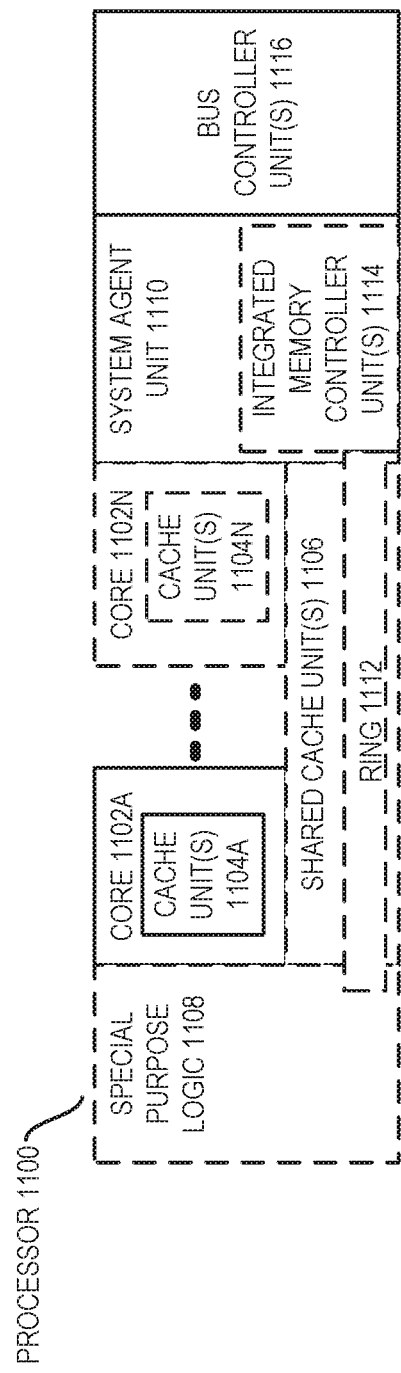
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
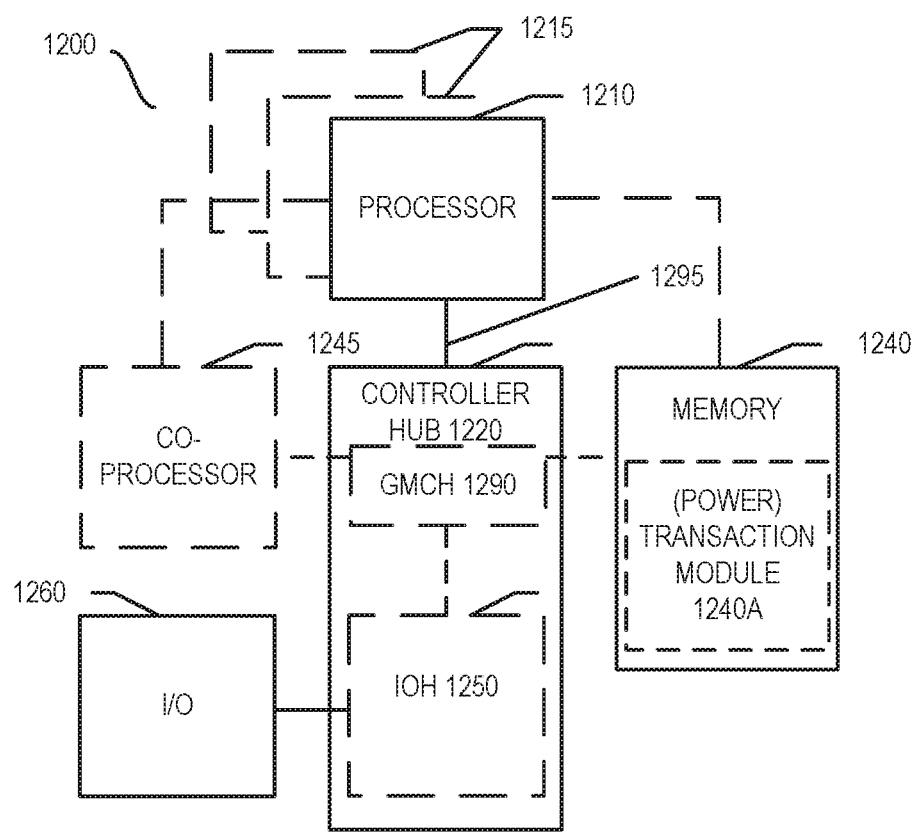
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include a (e.g., memory and/or power) transaction module 1240A, for example, to store code that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
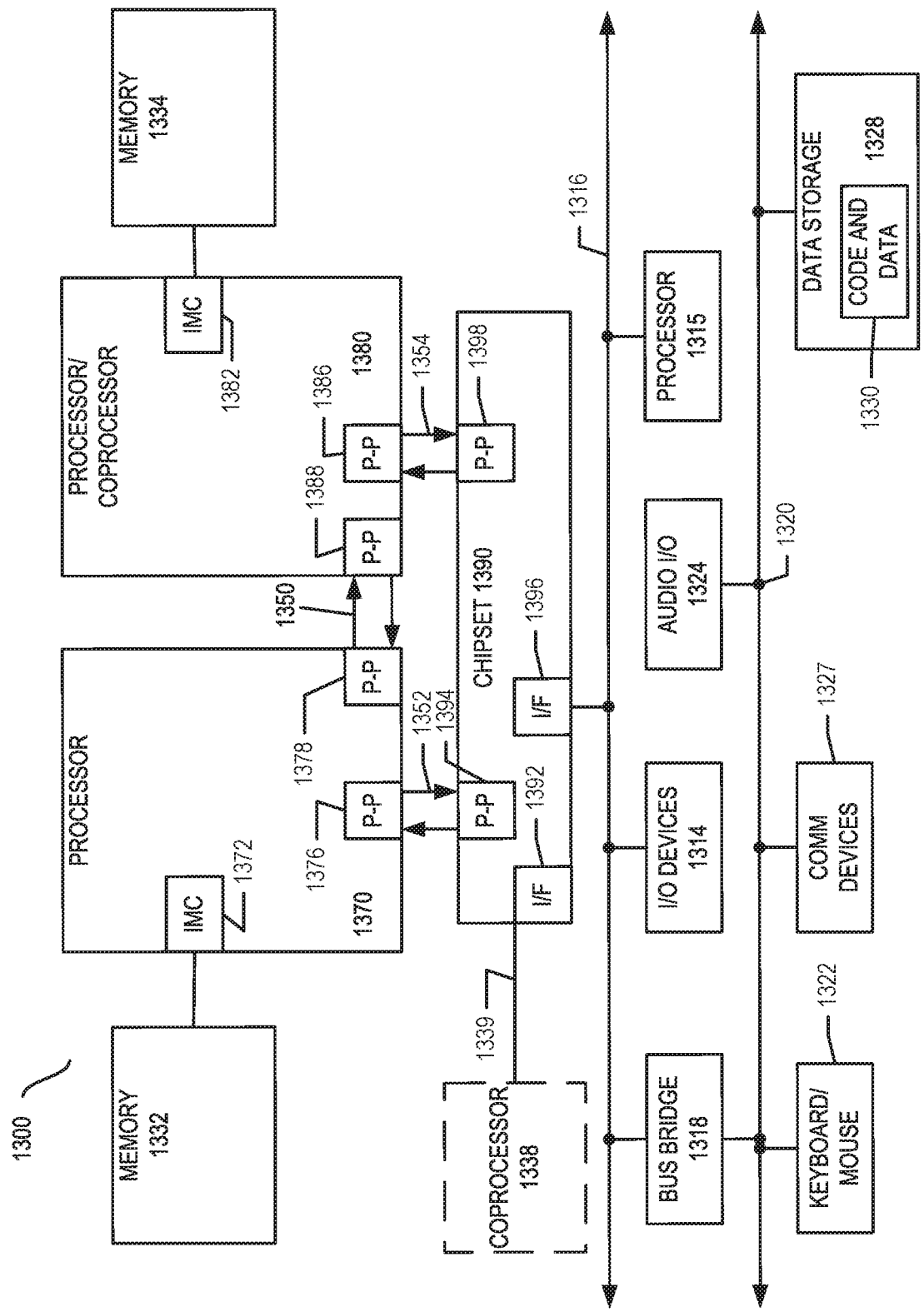
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
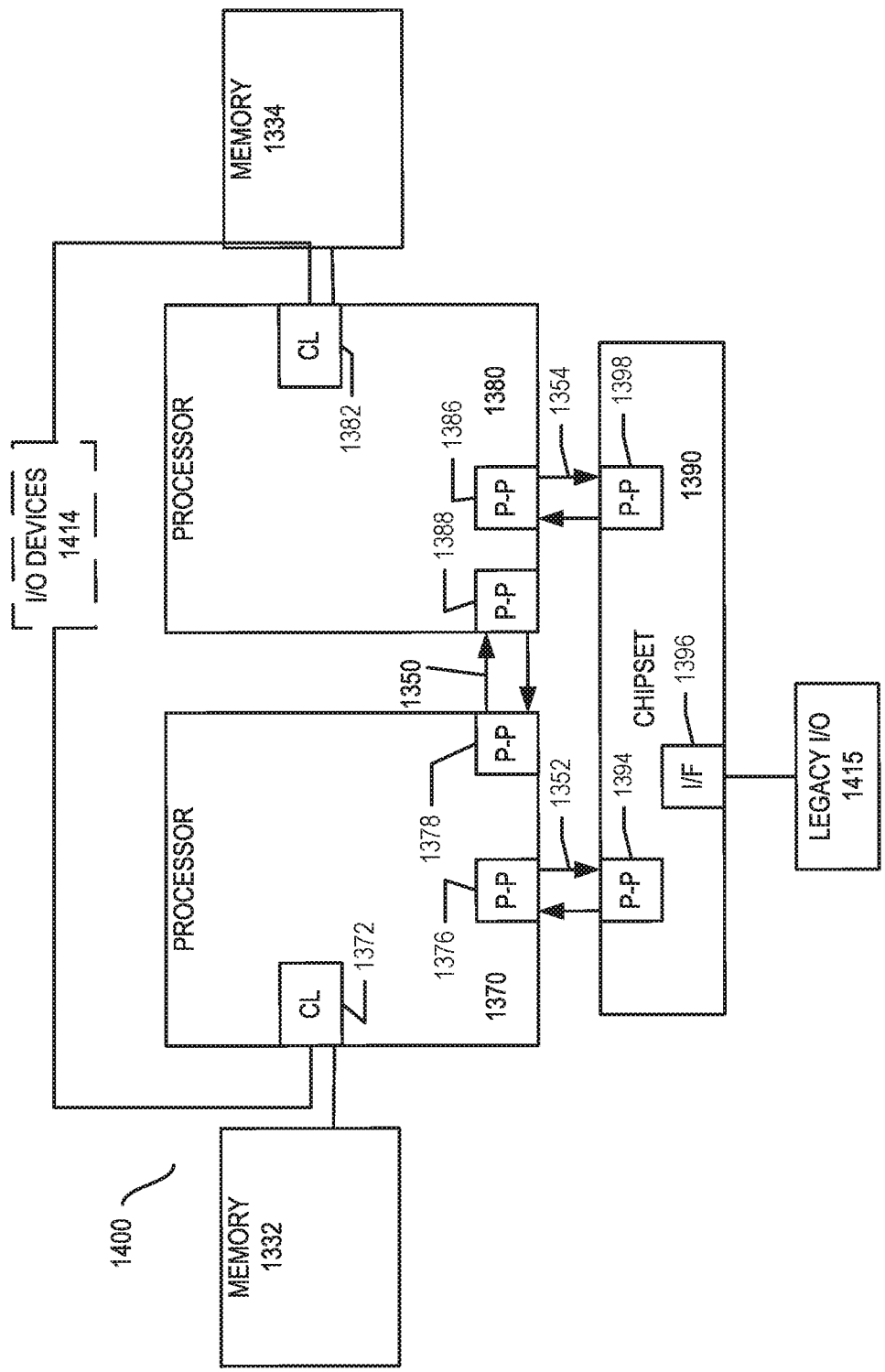
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
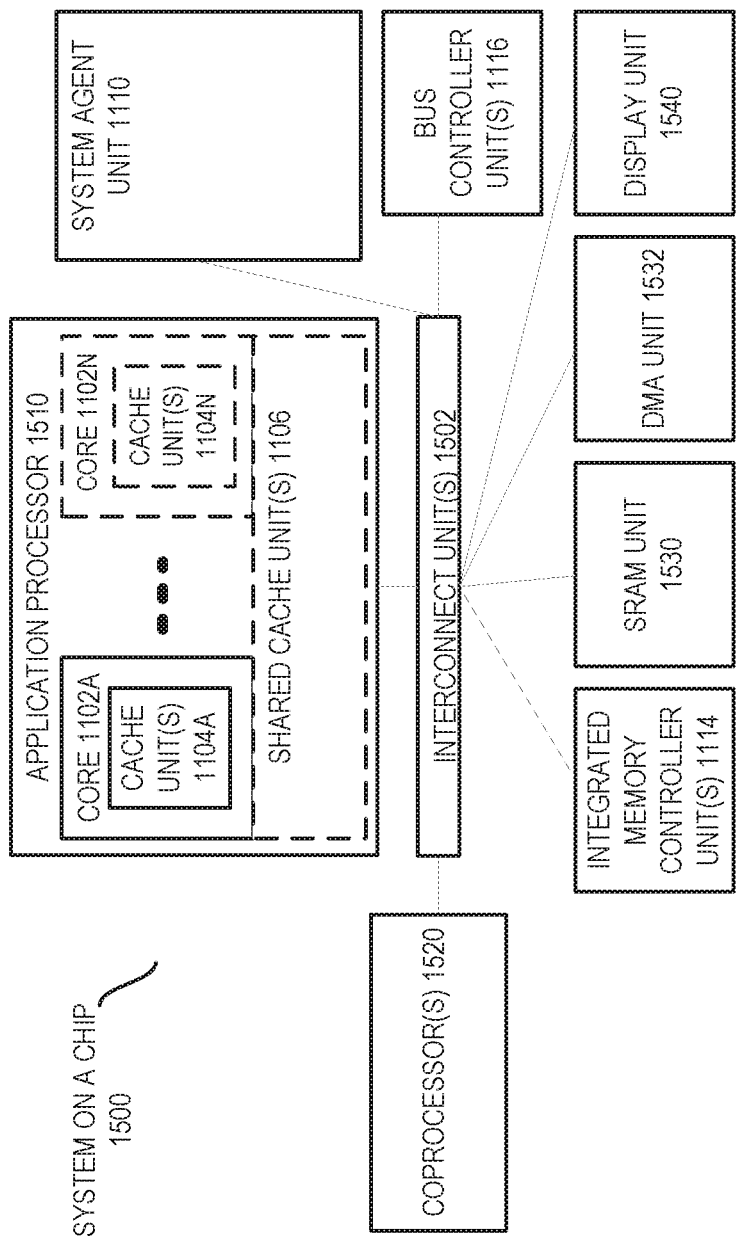
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. A hardware apparatus comprising:
 a hardware processor having a core;
 a plurality of power domains to transition to one of a plurality of power states in response to a power management command for each power domain; and
 a power transaction unit to:
  assign a first power management command as a first power transaction and a second power management command as a second power transaction for concurrent execution,
  perform a commit of the first power transaction and the second power transaction when there is no conflict between the first power transaction and the second power transaction, and perform an abort of the first power transaction and a commit of the second power transaction when there is a conflict between the first power transaction and the second power transaction.

2. The hardware apparatus of claim 1, wherein the first power transaction and the second power transaction each include multiple instructions.

3. The hardware apparatus of claim 1, further comprising a plurality of power state registers to receive the power management command for each domain.

4. The hardware apparatus of claim 3, wherein the conflict is the first power transaction to write to a power state register that the second power transaction has written.

5. The hardware apparatus of claim 1, wherein the power transaction unit is to not issue a lock.

6. The hardware apparatus of claim 1, wherein the conflict is the first power transaction and the second power transaction to write conflicting power management commands for a shared power domain.

7. The hardware apparatus of claim 1, wherein, when there is the conflict, a transition of a power domain in response to execution of the second power transaction is only visible to other transactions after the commit of the second power transaction.

8. The hardware apparatus of claim 1, further comprising a memory transaction unit to perform a commit of a first thread and a second thread after concurrent execution of the first thread on the core and the second thread on a second core of the hardware processor unless the first thread and the second thread are to modify a same memory address.

9. A method comprising:
providing a plurality of power domains of a hardware apparatus including a hardware processor to transition to one of a plurality of power states in response to a power management command for each power domain;
assigning a first power management command as a first power transaction and a second power management command as a second power transaction for concurrent execution;
performing a commit of the first power transaction and the second power transaction when there is no conflict between the first power transaction and the second power transaction; and
performing an abort of the first power transaction and a commit of the second power transaction when there is a conflict between the first power transaction and the second power transaction.

10. The method of claim 9, wherein the first power transaction and the second power transaction each include multiple instructions.

11. The method of claim 9, further comprising receiving the power management command for each domain at a power state register.

12. The method of claim 11, wherein the conflict is the first power transaction writing to a power state register that the second power transaction has written.

13. The method of claim 9, wherein no lock is issued.

14. The method of claim 9, wherein the conflict is the first power transaction and the second power transaction writing conflicting power management commands for a shared power domain.

15. The method of claim 9, wherein, when there is the conflict, a transition of a power domain in response to execution of the second power transaction is only visible to other transactions after the commit of the second power transaction is performed.

16. The method of claim 9, further comprising performing a commit of a first thread and a second thread after concurrent execution of the first thread and the second thread on the hardware processor unless the first thread and the second thread are to modify a same memory address.

17. A non-transitory machine readable storage medium having stored program code that when processed by a machine causes a method to be performed, the method comprising:
providing a plurality of power domains of a hardware apparatus including a hardware processor to transition to one of a plurality of power states in response to a power management command for each power domain;
assigning a first power management command as a first power transaction and a second power management command as a second power transaction for concurrent execution;
performing a commit of the first power transaction and the second power transaction when there is no conflict between the first power transaction and the second power transaction; and
performing an abort of the first power transaction and a commit of the second power transaction when there is a conflict between the first power transaction and the second power transaction.

18. The non-transitory machine readable storage medium of claim 17, wherein the first power transaction and the second power transaction each include multiple instructions.

19. The non-transitory machine readable storage medium of claim 17, wherein the method further comprises receiving the power management command for each domain at a power state register.

20. The non-transitory machine readable storage medium of claim 19, wherein the conflict is the first power transaction writing to a power state register that the second power transaction has written.

21. The non-transitory machine readable storage medium of claim 17, wherein the method includes no lock being issued.

22. The non-transitory machine readable storage medium of claim 17, wherein the conflict is the first power transaction and the second power transaction writing conflicting power management commands for a shared power domain.

23. The non-transitory machine readable storage medium of claim 17, wherein, when there is the conflict, a transition of a power domain in response to execution of the second power transaction is only visible to other transactions after the commit of the second power transaction is performed.

24. The non-transitory machine readable storage medium of claim 17, wherein the method further comprises performing a commit of a first thread and a second thread after concurrent execution of the first thread and the second thread on the hardware processor unless the first thread and the second thread are to modify a same memory address.

* * * * *